Figure 1:
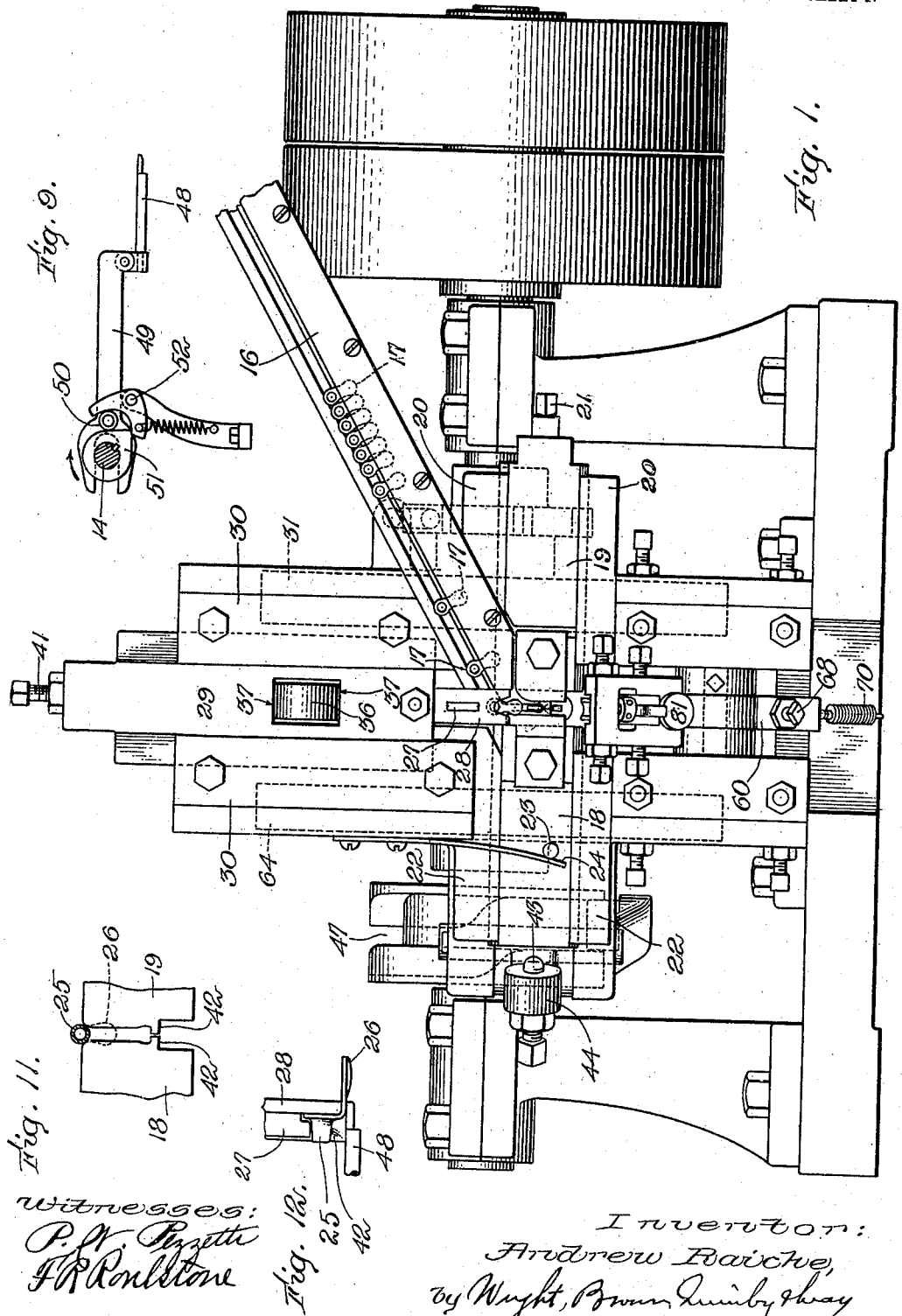

A. RAICHE.
MACHINE FOR MAKING LACING HOOKS.
APPLICATION FILED JUNE 23, 1910.
980,437.
Patented Jan. 3, 1911.
3 SHEETS—SHEET 3.
Fig. 3.      Fig. 4.      Fig. 5.
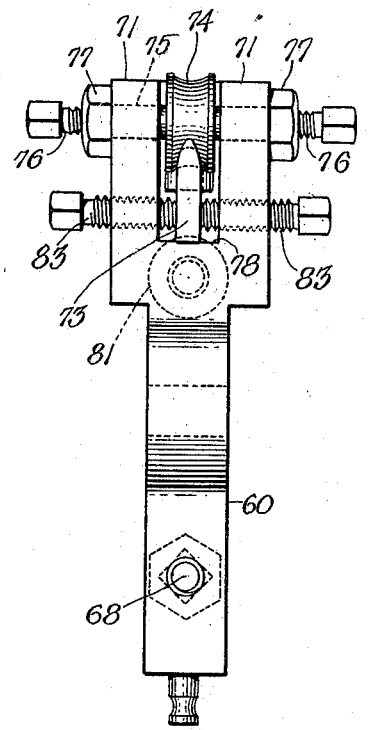
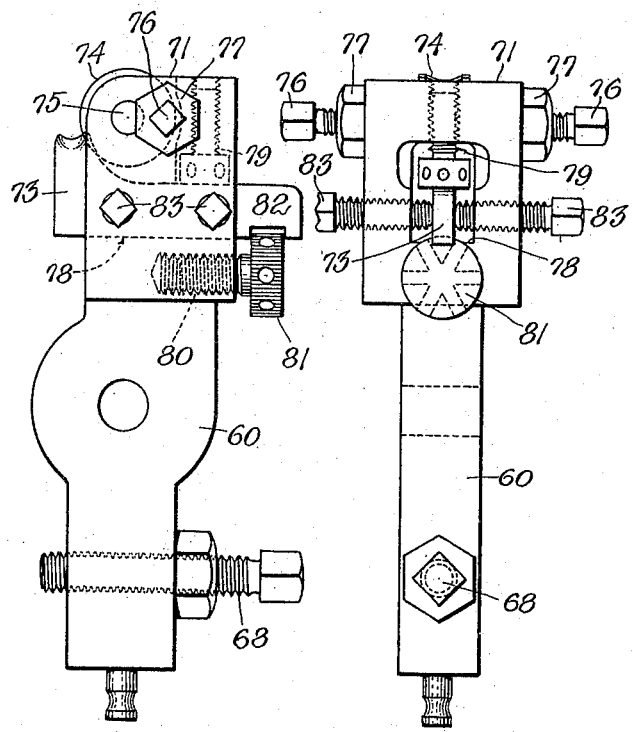
Fig. 6.      Fig. 7.      Fig. 8.
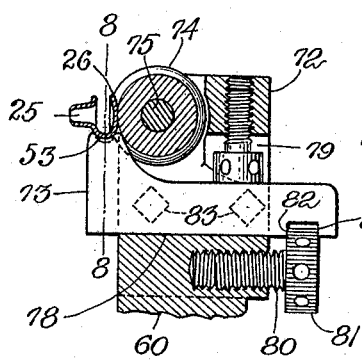
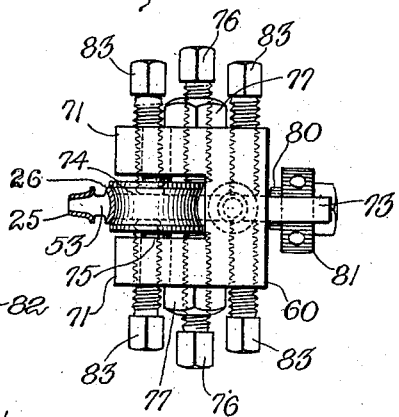
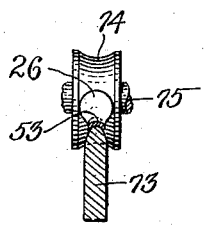
Witnesses:
Inventor:
Andrew Raiche,
by Wright, Brown, Quinby & Gray
Attorneys.

UNITED STATES PATENT OFFICE.

ANDREW RAICHE, OF FAIRHAVEN, MASSACHUSETTS, ASSIGNOR TO ATLAS TACK COMPANY, OF FAIRHAVEN, MASSACHUSETTS, A CORPORATION OF NEW JERSEY.

MACHINE FOR MAKING LACING-HOOKS.

980,437.

Specification of Letters Patent.

Patented Jan. 3, 1911.

Application filed June 23, 1910. Serial No. 568,479.

*To all whom it may concern:*

Be it known that I, ANDREW RAICHE, of Fairhaven, in the county of Bristol and State of Massachusetts, have invented certain new and useful Improvements in Machines for Making Lacing-Hooks, of which the following is a specification.

This invention relates to machines for forming lacing hooks such as those used in footwear.

The purpose of the invention is to provide an improved forming tool by which the neck of the hook is indented or concaved and by which the U shape of the hook is preserved during the action of the indenting tool.

To those familiar with the process of forming lacing hooks it is well known that the neck of the hook is indented or concaved after the hook is given its final U shape, the purpose of thus indenting the neck being to stiffen the neck and also to provide a convex inner surface over which the lacing may be drawn tight without unduly wearing the lacing.

In machines of this type hitherto used a holder has been provided for carrying a hook-bending tool to give the final U shape and also for carrying the indenting tool for indenting the neck of the hook. In such machines no provision for adjustment of either one of these forming devices with relation to the other has been provided, and it is necessary when one of said tools does not bear the desired relation to the other to trim the indenting tool with a file or otherwise when such trimming gives the desired result, but otherwise entirely to discard the indenting tool and provide a new indenting tool with sufficient material to adapt it when correctly formed to bear the desired relation to the other tool. This necessity for frequently discarding the indenting tool, or at least for trimming it from time to time, not only requires an undue amount of time but requires a separate tool holder and set of tools for each style of lacing hook. In other words, the tools are not adapted to be adjusted for lacing hooks of different sizes and styles.

According to the present invention, the indenting tool is secured in the holder by adjusting means by which it may be adjusted in two directions with relation to the tool which bends the hook to give it its U shape. The indenting tool may therefore be positioned accurately with relation to the bending tool for indenting lacing hooks of all shapes and sizes, and it may also be adjusted from time to time for the purpose of overcoming the defect due to the wearing away of the work engaging surface.

Figure 2:
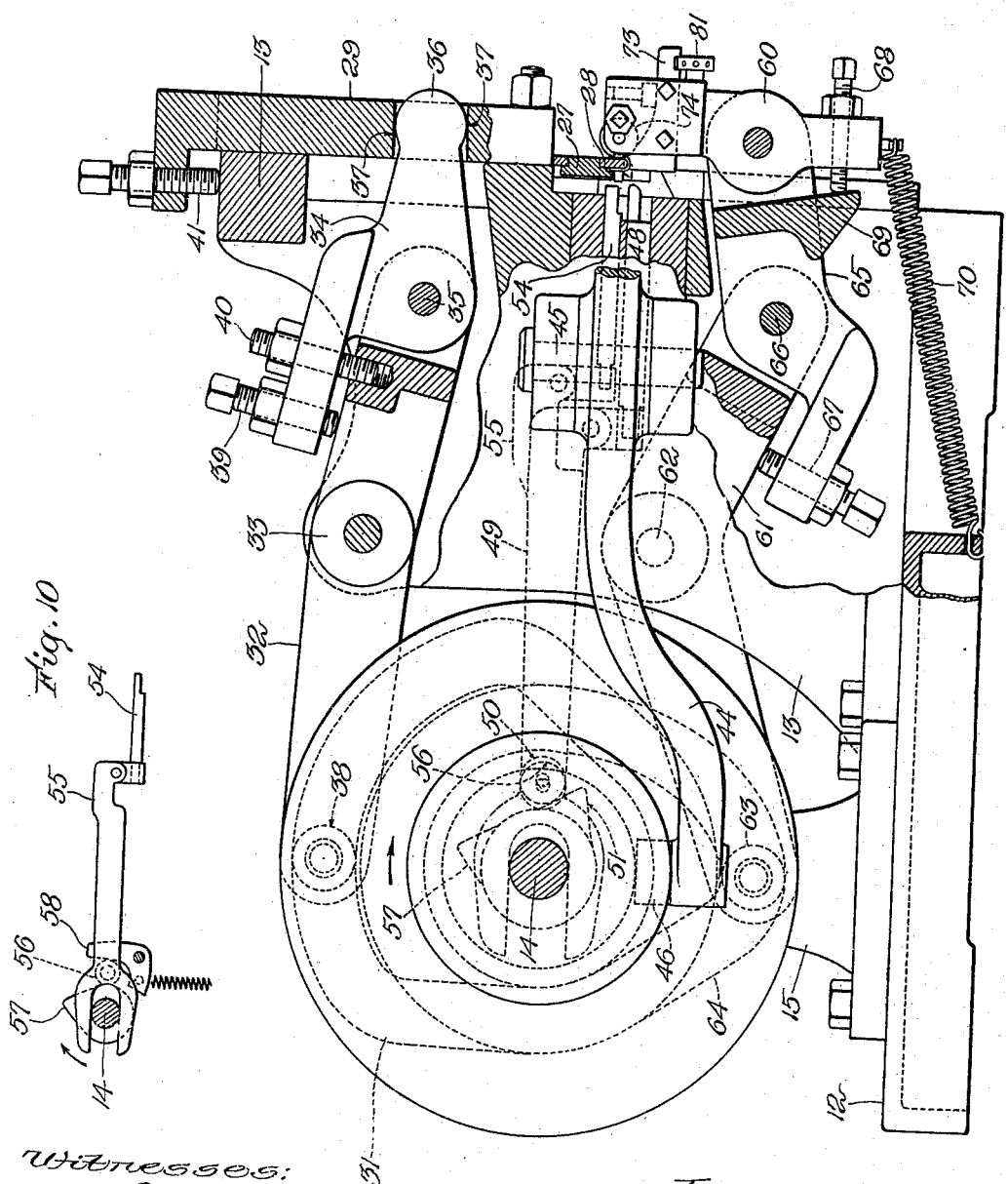

Of the accompanying drawings which illustrate one form in which the invention may be embodied, Figure 1 represents a front elevation of a machine for forming lacing hooks, equipped with the present improved forming device. Fig. 2 represents a longitudinal vertical section of the machine. Fig. 3 represents a rear elevation of the tool holder, including the tools for producing the final U shape of the hook and for indenting the neck of the hook. Fig. 4 represents a side elevation of said holder and forming tools. Fig. 5 represents a front elevation of the same. Fig. 6 represents a vertical section of the upper portion of the holder in the act of forming a hook, this view bearing the same relation to the work as that shown by Fig. 2. Fig. 7 represents a top plan view of the forming devices, including a lacing hook in section. Fig. 8 represents a vertical section of a lacing hook and the indenting tool on line 8—8 of Fig. 6, and including the bending tool. Fig. 9 represents an elevation partly in section of mechanism for bending the hook preliminarily to the action of the tools which give the hook its final form. Fig. 10 represents a side elevation partly in section of mechanism for ejecting the completed hooks. Fig. 11 represents the adjacent ends of coacting members between which the lacing hooks are held while they receive their final form. Fig. 12 represents a side elevation of a lacing hook after being partly bent to give the neck its U shape, this figure also including the forming tool for this purpose.

The same reference characters indicate the same parts wherever they occur.

A brief description of a hook-forming machine is given in order to convey a clear understanding of the essential features of the invention which follow, but it should be understood that the invention is by no means limited to the machine which is illustrated and described.

The base of the machine is indicated at 12, and the frame in which the various mechanisms hereinafter described are mounted is indicated at 13, said frame being affixed upon the base.

14 indicates the power shaft which rotates in the direction of the arrow in Fig. 2, said shaft being mounted in any suitable bearings in brackets such as that indicated at 15.

Fig. 1 illustrates an inclined race which is indicated at 16, said race being for the purpose of conducting the partially formed lacing-hook blanks from a reservoir (not shown) to the point where they are given their ultimate form. The partially formed blanks are indicated at 17, and they lack only the bending of the neck to a U shape and the indenting of the neck. Each partially formed blank as it emerges from the lower end of the race 16 is prevented from dropping by a pair of coacting blocks which are indicated respectively at 18 and 19. The block 19 is mounted in dovetail guides 20 formed upon the frame, said guides being horizontal. The block is at all times stationary while the machine is in operation, but for the purpose of preliminarily adjusting it it is provided with an adjusting screw 21. The block 18 is likewise mounted in horizontal guides 22, but it is adapted to move toward and from the block 19 during the operation of the machine. The block 18 is provided with a stud 23 which is engaged by a leaf spring 24, the spring exerting its tension to move the block toward the block 19. The adjacent ends of the blocks 18 and 19 are in the vertical plane of the skirt 25 of the hook blank, so that when the blank emerges from the end of the race 16 the skirt rests upon the opposite upper corners of the blocks 18 and 19 as shown by Fig. 11, the previously crowned head 26 hanging in front of the blocks. The distance between the ends of the blocks at this time is slightly less than the diameter of the skirt 25, but the skirt is immediately engaged and depressed into the space between the blocks, thus repelling the block 18 against the tension of the spring 24. The skirt is depressed by a block 27 which is affixed to the rear side of a vertically movable throat plate 28. The throat plate is carried by a slide 29, said slide being mounted in vertical guides 30 on the frame 13. The mechanism for reciprocating the slide 29 consists of a cam 31 affixed upon the shaft 14, a lever 32 mounted upon a fulcrum stud 33 and an adjustable extension 34 carried by the lever 32. The extension 34 is pivotally connected with the lever 32 by a pin 35, and it is formed with a partially cylindric head 36 which occupies a transverse opening in the slide 29 and engages the opposite parallel surfaces 37 of the slide. The lever 32 is provided with a cam roll 38 which coacts with the cam 31. The extension 34 is provided with complemental adjusting screws 39 and 40, said screws engaging the lever 32 with the effect of fixing the extension with relation to the lever. By means of the screws the extension 34 may be adjusted about its pivot 35 to vary the range of movement of the slide 29. The slide is provided with an adjustable stop 41 which is adapted to engage a portion of the frame 13 when the slide is depressed, said stop serving to position the slide absolutely and thus eliminate lost motion due to the several connections between the slide and the cam 31.

The downward movement of the block 27 places the skirt 25 against projections 42 formed respectively upon the blocks 18 and 19, said projections coöperating with the block 27 to maintain the blank 17 in the desired position where it is given its final form. The block 18 at this time is engaged by an adjustable screw 43 (see Fig. 1) mounted at the forward end of the lever 44. The lever is mounted upon a vertical stud 45 and is provided with a cam roll 46 at its rear end, said cam roll coacting with the grooved cam 47 on the shaft 14. The function of the cam and the arm is to reinforce the closing tension of the block 18 and hold the skirt 25 firmly during the operation of the devices which act subsequently.

The next operation after the blank has been depressed to the projections 42 is to partially bend the neck to the form shown by Fig. 12. The tool for thus forming the neck is indicated in Figs. 2 and 9 at 48. This tool is mounted to slide horizontally in a hole bored through the frame 13, as shown by Fig. 2. The rear end of the tool is connected to a thrust rod 49 whose rear end bestraddles the shaft 14. The rod 49 is provided with a roll 50 which is adapted to be engaged by a cam 51 on the shaft, the roll being held against the cam by a spring-actuated lever 52. The tool 48 when projected forwardly by the cam passes under the lower end of the throat plate 28 and thus bends the hook portion of the blank 17 to an angle of ninety degrees, after which it is immediately retracted by its spring.

The next operation consists in completing the shaping of the hook to give it its final U-shape, said shaping being completed by pressing the head 26 of the hook upwardly against the front side of the throat plate 28. During the latter part of the upward bending of the head 26 the neck 53 of the hook is engaged by the indenting tool. The throat plate 28 is raised after the completion of the hook-forming operation, and the hook remains between the blocks 18 and 19 still subject to the tension of the spring 24. The reinforcing member 43 is retracted at this time, and an ejector 54 (see Figs. 2 and 10) is moved forward to eject the hook from the blocks 18 and 19. The ejector 54 is illustrated as being arranged and actuated in a manner similar to that of the bending tool 48. The ejector is mounted to slide in a bearing of the frame 13, and its rear end is connected to a plunger 55 whose rear end bestraddles the shaft 14. The plunger carries a roll 56 which coacts with a cam 57 on the shaft, said roll being held against the cam by a spring-actuated lever 58.

The holder for the forming tools which constitutes the subject-matter of the present invention is indicated at 60. The holder is movable in a direction substantially vertical, and for this reason it is carried by a lever 61 which is mounted upon a pivot stud 62. The rear end of the lever is provided with a roll 63 which coacts with a cam 64 on the shaft 14. The holder 60 is not mounted directly upon the lever 61 but is mounted upon an interposed member 65 which constitutes an adjustable extension of the lever 61. The extension 65 is pivotally connected to the lever 61 by a pin 66, and it is provided with an adjusting screw 67 which is adapted to abut against the lever 61. The lower end of the tool holder 60 is likewise provided with an adjusting screw 68 which is adapted to engage an abutment 69 on the extension member 65. A spring 70 connected to the lower end of the tool holder 60 exerts its tension at all times to maintain the screw 68 in contact with the abutment 69, and the tension thus transmitted to the extension 65 also serves to maintain the screw 67 in contact with the lever 61. The purpose of the screw 67 is to effect vertical adjustment of the holder 60 with relation to the lever 61, and the purpose of the screw 68 is to adjust the holder 60 for the purpose of counteracting a change of angle due to an adjustment of the extension 65 about its pivot 66. The tool holder 60 may therefore be adjusted vertically and adjusted so as to occupy the desired angular position The upper end of the holder 60 is formed with two separate ears 71, 71, which are connected by a bridge 72 (see Figs. 6 and 7). The indenting tool is indicated at 73, and a tool at 74 for engaging the previously crowned head 26 of the hook, the function of the tool 74 being to bend the blank by bending the head upwardly from the position shown by Fig. 12. The tool 74 is a roller having a concaved periphery. The roller is mounted between the ears 71 by means of a pin 75 upon which it is rotatable. As shown by Figs. 3 and 7, the space between the ears 71 is considerably greater than the width of the roll, and it is obvious therefore that the roll is adapted to be moved back and forth along the pin 75. The roll, however, is maintained in the desired position by a pair of opposite set-screws 76, the set-screws being adjusted to prevent appreciable endwise movement of the roll but at the same time to permit the roll to rotate.

Lock nuts 77 are provided for securing the set-screws 76. The length of the pin 75 is preferably slightly greater than the distance between the outer surfaces of the ear 71, and the pin is arranged to be engaged by the lock nuts 77. The lock nuts therefore serve the additional purposes of confining the pin 75 in the ears and also of holding the pin against rotation. It is desirable to have the roll 74 rotatable with relation to the pin 75 rather than to mount the pin so that it may rotate in its bearings in the ears 71. It is obvious, therefore, that whatever friction and wear are due to the rotation of the roll will not in any way affect the bearings for the pin 75, and when the roll by reason of long use becomes worn so as to wabble on the pin a new roll and, if desired, a new pin 75 may be inserted, and the new pin 75 will fit closely in the ears.

The indenting tool 73 is seated upon the surface 78 between the ears 71. It is held upon its seat by a screw 79 threaded in the bridge 72, and may be adjusted by a screw 80 which is threaded in the holder below the seat. The screw 80 has a cylindric head 81 which coacts with opposite shoulders 82 at the forward end of the indenting tool. The width of the indenting tool is considerably less than the space between the ears 71, and it is obvious, therefore, that the tool may be adjusted laterally. The holder is provided with two pairs of adjusting screws 83, said screws being threaded in the ears 71 in position to engage the indenting tool. The adjusting screws not only determine the lateral position of the indenting tool but they also serve to clamp it securely in the desired position.

When the holder 60 is elevated by the action of the cam 64, the roll 74 first strikes the head 26 when the head is in the position shown by Fig. 12, and the head is thereby bent upwardly against the front surface of the throat plate 28. During the latter part of the upward movement of the holder 60 the indenting tool 73 engages the neck 53 of the hook, as shown by Figs. 6 and 8, thus giving the neck the desired curvature. The operations of giving the hook its final U shape and of indenting the neck occur simultaneously, and the one, therefore, cannot in any way counteract the other. The holder 60 after being elevated is immediately depressed, and the ejector 54 is thereafter actuated to expel the completely formed hook.

It should be noted that the lateral adjustment of the bending roll 74 does not require lateral adjustment of the holder 60, but that the roll may be adjusted laterally with relation to the holder. It should also be noted that the indenting tool may be adjusted in two directions with relation to the bending roll: First, the indenting tool may be adjusted toward and from the bending roll; second, it may be adjusted laterally so as to center it with relation to the bending roll and the neck of the lacing hook.

Having thus explained the nature of my said invention and described a way of constructing and using the same, although without attempting to set forth all of the forms in which it may be made or all of the modes of its use, what I claim is:

1. In a machine for forming lacing hooks, a tool holder, and two tools mounted thereon, one of said tools being adapted to engage the head of a hook and bend the neck of the hook to a U-shape, and the other of said tools being adapted to indent the neck of the hook, said indenting tool being adjustable with relation to said bending tool.

2. In a machine for forming lacing hooks, a tool holder, and two tools mounted thereon, one of said tools being adapted to engage the head of a hook and bend the neck of the hook to a U-shape, and the other of said tools being adapted to indent the neck of the hook, each of said tools being independently adjustable with relation to the holder.

3. In a machine for forming lacing hooks, a tool holder, a tool adapted to indent the neck of a lacing hook, and adjustable means for affixing said tool upon the tool holder, said means being adapted to vary the position of said tool with relation to the holder.

4. In a machine for forming lacing hooks, a tool holder, two tools mounted thereon, one of said tools being adapted to engage the head of a hook and bend the neck of the hook to a U-shape, adjustable means for positioning said bending tool laterally with relation to the holder, the other of said tools being adapted to indent the neck of the hook, and adjustable means for rigidly securing said indenting tool upon the holder, said securing means being adapted to position said indenting tool laterally with relation to said bending tool.

5. In a machine for forming lacing hooks, a tool holder formed with a seat, a tool for indenting the neck of a hook, said tool being arranged upon said seat, adjustable means for positioning said tool laterally upon its seat and for locking said tool against lateral movement, adjustable means for positioning said tool in lines transverse of the aforesaid lateral adjustment, and means for clamping said tool against its seat.

6. In a machine for forming lacing hooks, a tool holder formed with separated portions having bearings for a pin, a pin arranged in said bearings and extending through said separated portions, a rotatable tool for engaging the head of a lacing hook to bend the neck of the hook, said tool being less in width than the distance between said separated portions, oppositely disposed adjusting screws threaded in said separated portions and arranged to engage the ends of said tool to position said tool laterally, and means having the dual function of clamping said screws against rotation and of clamping said pin against rotation.

7. In a machine for forming lacing hooks, a tool holder formed with a seat, a tool for indenting the neck of a lacing hook, said tool being arranged upon said seat, adjustable means moving said tool in all directions upon its seat, said adjustable means being adapted to positively hold said tool in the desired position on its seat, and means for engaging the said tool to hold it positively upon its seat.

8. In a machine for forming lacing hooks, a tool holder, a pin mounted in said holder, a tool arranged upon said pin, said tool being adapted to engage the head of a lacing hook to bend the neck of the hook, and adjustable means for moving said tool along the length of said pin and for positively holding said tool at various positions upon said pin.

In testimony whereof I have affixed my signature, in presence of two witnesses.

ANDREW RAICHE.

Witnesses:
   FREDERICK W. LUSCOMB,
   W. P. ABELL.